United States Patent [19]

Haüser

[11] Patent Number: 4,856,307
[45] Date of Patent: Aug. 15, 1989

[54] DEVICE FOR PROTECTING MOTOR-VEHICLE WHEELS AGAINST THEFT

[75] Inventor: Herbert P. Haüser, Elsdorf-Heppendorf, Fed. Rep. of Germany

[73] Assignee: Dom-Sicherheitstechnik GmbH & Co KG, Fed. Rep. of Germany

[21] Appl. No.: 209,654

[22] Filed: Jun. 22, 1988

[30] Foreign Application Priority Data

Jul. 10, 1987 [DE] Fed. Rep. of Germany ....... 3722870

[51] Int. Cl.⁴ ............................................. F16B 41/00
[52] U.S. Cl. ...................................... 70/165; 70/231; 70/373
[58] Field of Search .............. 70/231, 232, 229, 230, 70/DIG. 57, 163, 165–169, 373, 173, 449, 370, DIG. 13

[56] References Cited

U.S. PATENT DOCUMENTS

| | | | |
|---|---|---|---|
| 1,245,957 | 11/1917 | Nussbaum | 70/230 |
| 1,433,363 | 10/1922 | Freysinger | 70/373 |
| 1,625,901 | 4/1927 | Lay | 70/231 |
| 3,800,574 | 4/1974 | Reid et al. | 70/231 |
| 4,406,140 | 9/1923 | Wolter | 70/232 X |

FOREIGN PATENT DOCUMENTS

| | | | |
|---|---|---|---|
| 2301920 | 7/1974 | Fed. Rep. of Germany | 70/231 |
| 2917034 | 11/1979 | Fed. Rep. of Germany | 70/373 |
| 921991 | 1/1947 | France | 70/229 |
| 431153 | 2/1948 | Italy | 70/230 |

*Primary Examiner*—Lloyd A. Gall
*Attorney, Agent, or Firm*—Barry E. Deutsch

[57] ABSTRACT

A device for protecting motor-vehicles against theft comprising a freely rotatable sleeve covering the polygonal head of a wheel nut or screw, into which sleeve a cylinder lock engages rotatably, which lock is provided with at least one tumbler entering the inner wall of a cylinder lock location cavity of said polygonal head which projects beyond the circumference of said cylinder lock. In the locking position, said tumbler engages behind a cooperating locking shoulder which is located on an annular body inserted into an axial chamber of said polygonal head and locked in position thereto.

8 Claims, 3 Drawing Sheets

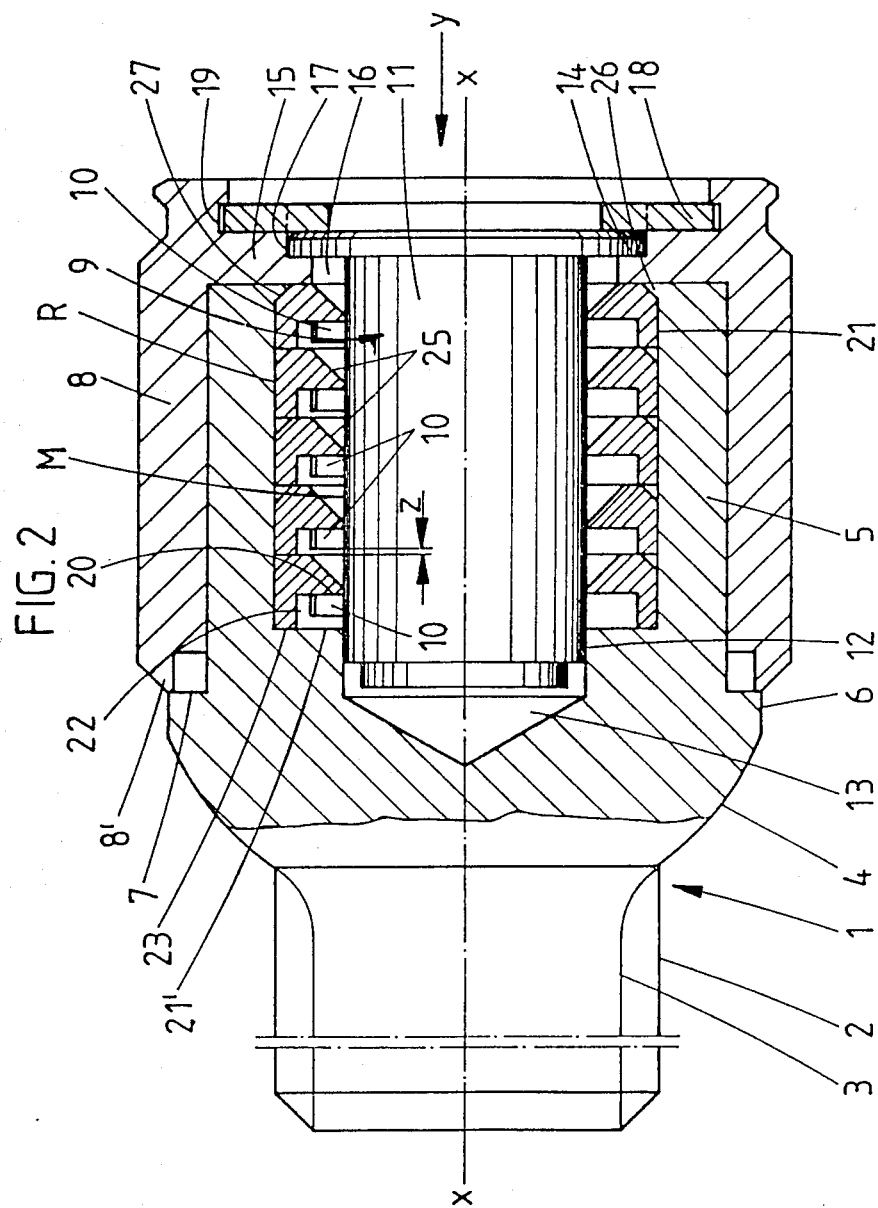

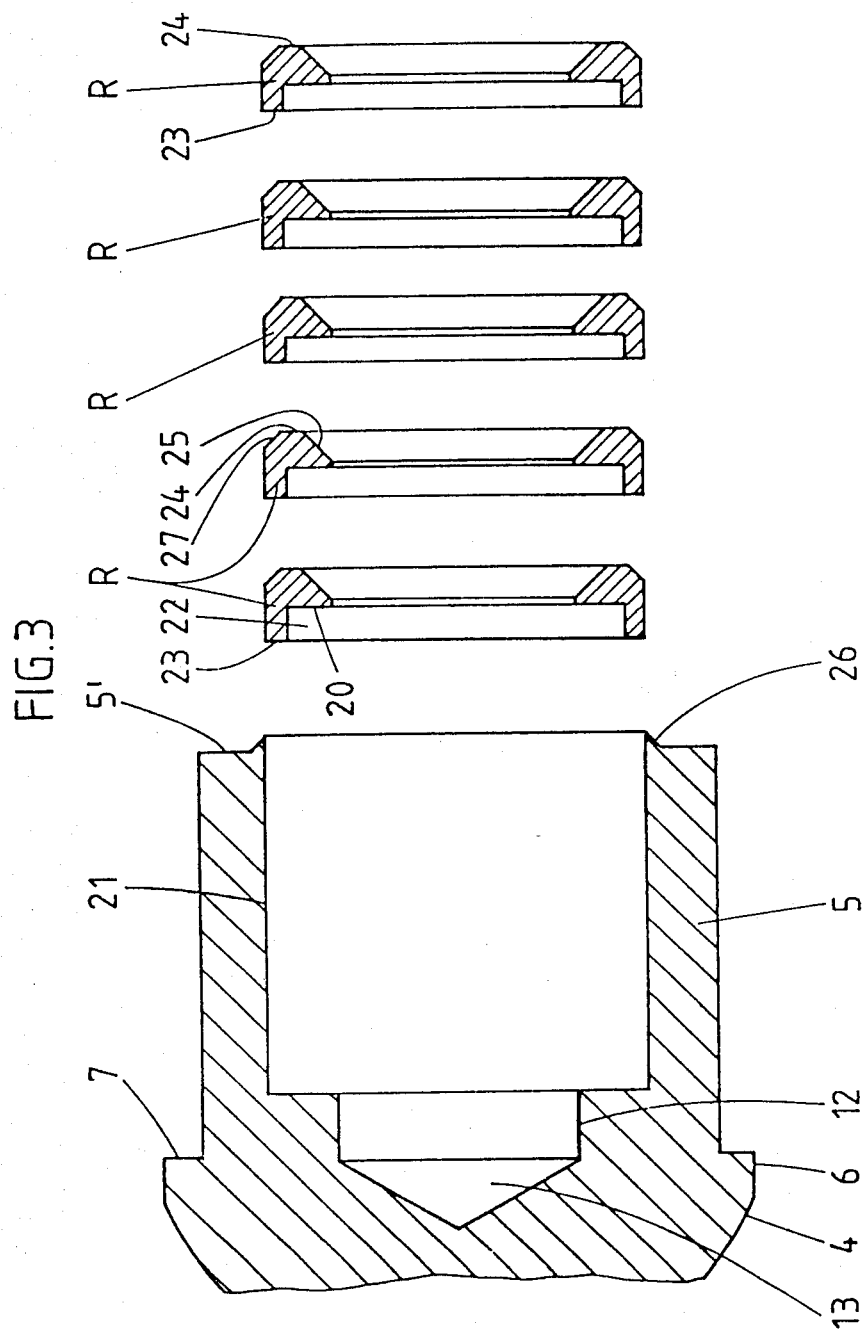

DEVICE FOR PROTECTING MOTOR-VEHICLE WHEELS AGAINST THEFT

BACKGROUND OF THE INVENTION

The invention is concerned with a device for protecting motor-vehicle wheels against theft which device comprises a freely rotatable sleeve covering the polygonal head of a wheel nut or screw. A cylinder lock, which is provided with at least one tumbler entering the inner wall of a cylinder lock location cavity of the polygonal head which projects beyond the circumference of the cylinder lock, engages rotatably into the sleeve. In the position for preventing theft, the tumbler engages behind a lock shoulder of the polygonal head.

Devices of this general type are known from EP-PS No. 0,039,855. The locking shoulder acting together with the tumbler is formed in the devices described in the European Patent by the one steep flank of an annular groove. According to the number of tumblers, a row of annular grooves lying closely one behind one another is provided. Because the recessing of the grooves is carried out from the relatively small location cavity it is difficult from the point of view of manufacture, even without taking into account the relatively tough material of such wheel nuts or screws. The narrow width of the groove is also frequently the cause of clogging of the turnings. It requires careful final inspection. The edge life of the turning tool is very short, which makes the manufacturing process more expensive.

It is also known from DE-OS No. 3,520,452 to abandon the direct engagement between tumbler and inner wall of the cylinder lock location cavity of the polygonal head and to guide in the engagement direction a spring-loaded locking member, which acts together with a radial locking shoulder of the polygonal head. The latch-like locking member, provided in pairs, yields when assigned to the sleeve in order then to spring latch-like into the locking position. By inserting a suitable key the locking member is moved out of the locking position by the tumblers, so that the rotary cylinder can then be withdrawn. Such a design is however expensive to manufacture and assemble.

SUMMARY OF THE INVENTION

An object of the invention is therefore to provide a theft-preventing device of the type described which, while retaining the desirable direct locking engagement of the tumbler provides substantial simplification regarding the provision of a locking shoulder, and in which sources of obstruction such as the clogging of turnings are reduced or substantially obviated.

The present invention provides a device for protecting motor-vehicle wheels against theft, comprising a freely rotatable sleeve covering the polygonal head of a wheel nut or screw, into which sleeve a cylinder lock engages rotatably, which lock is provided with at least one tumbler entering the inner wall of a cylinder lock location cavity of the polygonal head which projects beyond the circumference of the cylinder lock and in theft-preventing position engages behind a cooperating locking shoulder characterised in that the locking shoulder is located on an annular body inserted into an axial chamber of the polygonal head and locked in position thereto.

The device according to the invention is particularly advanced in the way it operates. In the device according to the invention, the recess forming the locking shoulder is no longer located within the polygonal head which provides only a relatively small operating space, but externally, where far better control of the material is possible, namely on a separate annular body. This provides at the same time the further advantage of a choice of material. From the point of view of the wearing quality, an annular body of aluminium would meet the practical requirements. Such an annular body is inserted into an axial chamber of the polygonal head which provides only a relatively small operating space, but externally, where far better control of the material is possible, namely on a separate annular body. This provides at the same time the further advantage of a choice of material. From the point of view of the wearing quality, an annular body of aluminium would meet the practical requirements. Such an annular body is inserted into an axial chamber of the polygonal head and fixed thereto. The relatively harder material of the polygonal head surrounding it thus acts as a protection and reinforcement. Fixing of the annular body is suitably accomplished by material deformation of the inner wall of the axial chamber engaging over the annular body. The caulking forces applied in this connection are small, since very small quantities are sufficient for adequate material displacement, ensuring the location of the body. The deformation material is preferably formed from an annular rib located at the end face of the polygonal head. The deformation therefore takes place in a freely accessible position. For a typical cylinder lock assembly in which there is a plurality of tumblers, there is a further advantage in the design in that, for the provision of more axially consecutively lying locking shoulders, more annular bodies are inserted into the axial chamber. The chamfer-providing tool is a borer or a milling cutter, which are tools with a long edge life. It has further proved to be advantageous, that each annular body has a recess departing from its cylinder lock location cavity area to form the locking shoulder, which recess extends to the mating annular end face pointing in the insertion direction of the cylinder lock. In this way a kind of rotationally symmetric angular profile is produced, the one angle side of which rests against the inner wall of the axial chamber and the other angle side of which points in the direction of the center of the axial chamber, which profile runs perpendicular with the longitudinal centre axis of the device. The annular body or bodies can perform an additional function, in that in an advantageous further development a circular run-up bevel directly in front of the locking shoulder carries out a latching action without requiring the tumbler, for example a disc tumbler, to be altered from its original design. In addition, it presents no problem of maneuverability in the manufacture of an annular body, here a normal turned part, to produce the run-up bevel jointly in one operation. This also applies with regard to the further provision that each annular body, in its end face pointing in the withdrawal direction is provided with a peripheral chamfer. In practice, the peripheral chamfer forms, together with the inner wall of the axial chamber, a housing annulus for the deformation material realizing the fixing in the area of the annular end face. A high-grade abutment of both materials can thus be attained so that a tightly-sealing joint is obtained which makes it impossible for even moisture to penetrate.

A further advantage of the device according to the invention results from the fact that a choice of materials is available for its construction. By a suitable choice of material for the construction of the lockable wheel nut, the weight of the lockable nut can be adjusted so that it is similar to the weight of the conventional wheel nuts. This weight equalization is important, so that wheels fitted with a lockable wheel nut do not show any imbalance.

BRIEF DESCRIPTION OF THE DRAWINGS

FIG. 2 illustrates an embodiment of the device in theft-preventing position with the key withdrawn, drawn to an enlarged scale compared to FIG. 1, in section and, FIG. 3 is a view of the device shown in FIG. 2 before the insertion of the annular bodies, in practice an exploded view.

DETAILED DESCRIPTION

Figure 1:
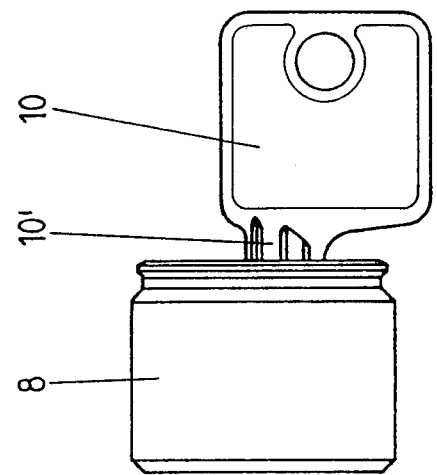
FIG. 1 illustrates an embodiment of the device according to the invention in side view, shown in separated form.
Figure 1:
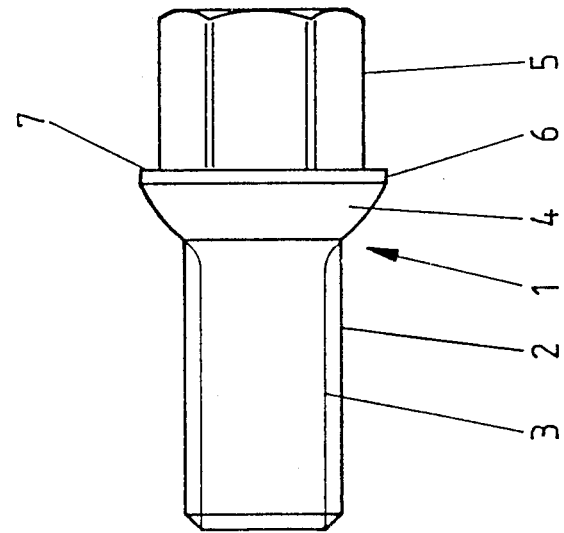

The device according to the invention is a wheel bolt. Its shank 2 bears external thread 3. A collar 4 is adjacent to the threaded shank 2 and engages, centering the wheel bolt 1 into a cavity (not shown) provided on a motor-vehicle wheel. The approximately hemispherical-like collar 4 carries a polygonal head 5 which is formed onto it and is of the same material. Between the two there is a cylindrical section 6, which is a little broader than the crest dimension of the polygonal head 5, so that a distinct intermediate step 7 remains. The head 5 is hexagonal.

The detachable part of the preferred embodiment of the device according to the invention is a sleeve 8. Its internal diameter corresponds to the crest dimension of the polygon, so that it can be mounted freely rotatable on the polygonal head 5, completely covering the latter, so that the polygonal head cannot be used to unscrew the wheel bolt 1. A cylinder lock 9 secures the covering function of the sleeve 8. The cylinder lock 9 extends into the appropriately hollowed polygonal head P and has a row of tumblers 10, in the form of disc tumblers. The latter are spring biased so that, in the key withdrawal position, they project beyond the surface M of the cylindrical cylinder housing 11, and in the inserted position of the key 10, they align with the surface M or stand back from it. The location cavity of the polygonal head 5 housing the cylinder lock 9 is identified 12. It is in fact a blind hole or bore, which terminates in a conical point 13. The entire axial length of the polygonal head 5 is used for the housing of the cylinder lock 9. The cylinder lock 9 and the shank 2 lie on a common longitudinal centre axis x—x of the wheel bolt 1. The apex of the cone 13 extends into the area of the collar 4.

At its end remote from the cone apex 13, the cylinder housing 11 is formed into a collar 14 extending beyond the cylindrical cross section of the housing. The collar is also of circular plan form and is rotatably mounted relative to the sleeve 8. The retaining zone lies within the area of a lateral base 15 of the sleeve 8. The lateral base 15 is penetrated centrally to allow the cylinder housing 11 to be passed through. The opening 16 has at its end a recess 17 open towards the outside, and which grips the periphery of the collar 14 in a way defined by the abutment. For the captive protection of the cylinder lock 9, a spring clip 18 covers the flange at its outer end. Spring clip 18 functions as a retaining ring and is clipped into an annular groove 19 of the lateral base 15 and the inner diameter of the clip includes room for the key shank 10' which is to be inserted through the ring.

The radially protruding tumblers 10 act together with fixed locking shoulders 20. The latter are formed on a separate annular body R placed into an axial chamber 21 of the polygonal head 5 and fixed thereto. The components used are turned components which are completely identical in shape, which can be manufactured economically on automatic machines. In conformity with the number of tumblers 10, five of such annular bodies R are inserted into the axial chamber 21 abutting each other. The axial thickness corresponds to the axial spacing dimension from lock shoulder 20 to locking shoulder 20.

The inside diameter of the annular bodies R corresponds to the inside diameter of the location cavity 12 for the lock housing 11. The annular bodies R thus occupy the diameter of this location cavity 12 up to the free end face 5' of the polygonal head, only interrupted by a recess 22 which provides the locking shoulder 20. The recess 22 takes up roughly half of the length of the annular body R and is located so that it runs, departing from the cylinder lock location cavity area, in the corresponding annular end face 23 pointing in the insertion direction (arrow y) of the cylinder lock 9. In this way an approximately rectangular section of the annular body is formed, the one side of which locates with its cylindrical surface against the inner wall of the axial chamber 21 of the cup-shaped body of the polygonal head 5. The other side lying at right angles thereto points in the radial direction into the interior of the cylinder lock location cavity 12.

The axial distance from the annular end face 23 to the locking shoulder 20 is greater than the thickness of the disc tumbler 10 so that in the direction of the arrow y, an axial clearance z towards the joint of adjacent annular bodies R remains or, in the case of the innermost annular body R towards the joint between this annular body and the annular bottom 21' of the axial chamber 21.

In order to make mounting of the sleeve 8 possible when the key is not inserted which, as said previously, brings about withdrawal of the tumblers 10, the annular bodies on the annular end face 24 pointing in the withdrawal direction of the cylinder lock 9 are provided with a circular run-up bevel 25. The bevel is in the form of a tapered flank which is infinitely reduced in diameter towards the center of the annular body. A taper inclination angle of approximately 45 degrees is proposed. The inclination starts at the level of the free tumbler end so that, when mounting the sleeve, the end portion of the tumbler 10 lying in the area of the run-up bevel 25 is retracted into the cylinder housing 11 against the action of the spring in order to spring back then behind the next locking shoulder 20, etc., until the normal position to be seen from FIG. 2 is obtained, in which the front edge 8' of the cup-shaped sleeve 8 butts against the intermediate step 7. The outer lateral edge of this front end 8' is chamfered, so that the overall surface in this zone converges onto the cylindrical section 6 over an obtuse angle.

As can be seen from FIG. 3, the inwardly-directed side of the annular body R does not taper out to form a kind of a lip or knife-edge but changes into a short cylindrical section.

To fix in position the annular bodies R put into the chamber in successive order, the method of material deformation is used, in which the last annular body R lying in the withdrawal direction of the cylinder lock 9 is covered at its edge by material of the inner wall of the axial chamber 21. The deformation material is provided by an annular web or rib 26 on the end face of the polygonal head 5. Viewed in cross section, an acute-angled annular rib is present in the region of the inner edge of the free end face 5' of the polygonal head 5. It is, in practice, an edge-shaped projection, the inner shank of which aligns co-planarly with the cylindrical inner wall of the axial chamber 21. The acute angle is in the region of approximately 45 degrees. In order to attain a clean sealing end, at least the last-inserted annular body R on the end face 24 pointing in the withdrawal direction is provided with a peripheral chamfer 27. The chamfer angle at this point is again about 45 degrees. As far as the material is concerned, the volume should in general be equal to that of the deformation material. The peripheral chamfer 27 housing the displaced deformation material however is designed so that there still remains a sufficient cross-sectional area between annular bodies R adjacent to each other. In the locked position, the inner side of the lateral base 15 rests fully against the corresponding end face 5' of the polygonal head 5, and partially also against the annular end face 24 of the last annular body R lying in the withdrawal direction.

I claim:

1. A device for protecting motor-vehicle wheels against theft, comprising a freely rotatable sleeve covering the polygonal head of a wheel bolt, into which sleeve a cylinder lock engages rotatably, which lock is provided with at least one tumbler entering the inner wall of the cylinder lock location cavity of said polygonal head which projects beyond the circumference of said cylinder lock and in a locking position engages behind a cooperating locking shoulder wherein said locking shoulder is located on an annular body inserted into an axial chamber of said polygonal head and locked in position thereto.

2. The device according to claim 1, wherein the locking of said annular body relative to the polygonal head results from material deformation of the inner wall of said axial chamber engaging over said annular body.

3. The device according to claim 2 wherein said polygonal head has an end face and deformation material is provided by an annular rib formed on the end face.

4. The device according to claim 3 wherein a plurality of annular bodies are inserted into said axial chamber to form a plurality of axially consecutively lying locking shoulders.

5. The device according to claim 4 wherein each annular body forming said locking shoulder has a recess formed in its cylinder lock location cavity area, which recess extends to the annular mating face pointing in the insertion direction of said cylinder lock.

6. The device according to claim 5 wherein a circular run-up bevel is provided on an annular end face of each of said annular bodies pointing in the withdrawal direction, in the opposite direction to the insertion direction of said cylinder lock, which bevel is reduced in diameter towards the center of each of said annular bodies.

7. The device according to claim 4 wherein each of said annular bodies is provided with a peripheral chamfer on an end face pointing in the withdrawal direction.

8. The device according to claim 7 wherein said peripheral chamfer of said annular body adjacent to said end face houses said deformation material provided by said annular rib.

* * * * *